United States Patent
Goncalves Jordao et al.

(10) Patent No.: US 11,710,480 B2
(45) Date of Patent: Jul. 25, 2023

(54) PHONETIC COMPARISON FOR VIRTUAL ASSISTANTS

(71) Applicant: International Business Machines Corporation, Armonk, NY (US)

(72) Inventors: Guilherme Goncalves Jordao, Sao Paulo (BR); Agostinho De Arruda Villela, Sao Paulo (BR); Felipe Gustavo Barbosa, Sao Paulo (BR); Carlos Eduardo da Silva, Sao Paulo (BR); Tulio Coppola Paronetti, Sao Bernardo do Campo (BR); Stiphanie Mara da Silva, Sao Paulo (BR); Laércio Santos Corrêa da Silva, Santo Andre (BR)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 16/534,443

(22) Filed: Aug. 7, 2019

(65) Prior Publication Data
US 2021/0043200 A1    Feb. 11, 2021

(51) Int. Cl.
*G10L 15/22* (2006.01)
*G06F 9/451* (2018.01)
(Continued)

(52) U.S. Cl.
CPC .............. *G10L 15/22* (2013.01); *G06F 9/453* (2018.02); *G06F 16/635* (2019.01);
(Continued)

(58) Field of Classification Search
None
See application file for complete search history.

(56) References Cited

U.S. PATENT DOCUMENTS 7,130,401 B2    10/2006 Rampey
7,277,854 B2    10/2007 Bennett
(Continued)

OTHER PUBLICATIONS

"3 Efficient Ways To Supply Your App With a Virtual Assistant", Cleveroad, <https://www.cleveroad.com/blog/how-to-create-virtual-assistant-apps-like-siri-and-google-assistant>, Aug. 5, 2018, 9 pages.
(Continued)

*Primary Examiner* — Jonathan C Kim
(74) *Attorney, Agent, or Firm* — Stephanie L. Carusillo

(57) ABSTRACT

In an approach for optimizing an intelligent virtual assistant by using phonetic comparison to find a response stored in a local database, a processor receives an audio input on a computing device. A processor transcribes the audio input to text. A processor compares the text to a set of user queries and commands in a local database of the computing device using a phonetic algorithm. A processor determines whether a user query or command of the set of user queries and commands meets a pre-defined threshold of similarity. Responsive to determining that the user query or command meets the pre-defined threshold of similarity, a processor identifies an intention of a set of intentions stored in the local database corresponding to the user query or command. A processor identifies a response of a set of responses in the local database corresponding to the intention. A processor outputs the response audibly.

20 Claims, 4 Drawing Sheets

(51) Int. Cl.
| | | |
|---|---|---|
| *G06F 16/683* | (2019.01) | |
| *G06F 16/635* | (2019.01) | |
| *G10L 15/18* | (2013.01) | |
| *G10L 15/187* | (2013.01) | |
| *G06F 16/638* | (2019.01) | |
| *G06F 16/903* | (2019.01) | |
| *G06F 3/16* | (2006.01) | |
| *G06F 16/33* | (2019.01) | |
| *G10L 15/02* | (2006.01) | |

(52) U.S. Cl.
CPC ......... *G06F 16/638* (2019.01); *G06F 16/685* (2019.01); *G06F 16/90344* (2019.01); *G10L 15/187* (2013.01); *G10L 15/1815* (2013.01); *G06F 3/167* (2013.01); *G06F 16/3343* (2019.01); *G10L 2015/025* (2013.01); *G10L 2015/223* (2013.01)

(56) References Cited

U.S. PATENT DOCUMENTS

| | | | |
|---|---|---|---|
| 9,082,402 B2 | 7/2015 | Yadgar | |
| 9,436,702 B2* | 9/2016 | Pryakhin | G06F 16/2246 |
| 9,514,747 B1 | 12/2016 | Bisani | |
| 9,646,609 B2 | 5/2017 | Naik | |
| 9,734,151 B2* | 8/2017 | Patel | G06F 16/40 |
| 10,387,575 B1 | 8/2019 | Shen | G06F 40/35 |
| 10,762,114 B1* | 9/2020 | Annunziata | G06F 9/54 |
| 10,832,668 B1* | 11/2020 | Devries | G10L 15/22 |
| 11,042,579 B2 | 6/2021 | Wegryn | G06F 16/3344 |
| 2009/0119289 A1* | 5/2009 | Gibbs | G06F 16/3322 707/999.005 |
| 2009/0162824 A1* | 6/2009 | Heck | G06Q 10/10 434/362 |
| 2010/0114571 A1* | 5/2010 | Nagatomo | G06F 16/433 704/235 |
| 2012/0215806 A1* | 8/2012 | Pryakhin | G06F 16/322 707/769 |
| 2012/0323877 A1* | 12/2012 | Ray | G06F 16/9535 707/706 |
| 2013/0041921 A1* | 2/2013 | Cooper | G06F 16/90335 707/E17.099 |
| 2013/0183944 A1* | 7/2013 | Mozer | H04L 12/2818 455/414.1 |
| 2014/0122059 A1* | 5/2014 | Patel | G06F 16/40 704/235 |
| 2014/0250097 A1* | 9/2014 | Shtilman | G06F 16/254 707/709 |
| 2014/0377735 A1* | 12/2014 | Byron | G09B 7/02 434/362 |
| 2015/0074112 A1* | 3/2015 | Liu | G06F 40/205 707/739 |
| 2015/0281401 A1* | 10/2015 | Le | G06F 9/547 709/203 |
| 2015/0347393 A1* | 12/2015 | Futrell | G06F 40/30 704/9 |
| 2017/0193111 A1* | 7/2017 | Tandiono | G06F 16/248 |
| 2017/0249336 A1* | 8/2017 | Rainey | G06Q 10/0635 |
| 2017/0322939 A1* | 11/2017 | Byron | G06N 20/00 |
| 2017/0329841 A1* | 11/2017 | Holmes | G06F 16/3343 |
| 2018/0060422 A1* | 3/2018 | Wegryn | G06F 16/3323 |
| 2018/0308003 A1* | 10/2018 | Singh | G06N 20/00 |
| 2019/0295531 A1* | 9/2019 | Rao | G10L 15/26 |
| 2020/0167390 A1* | 5/2020 | Nakano | G10L 15/26 |
| 2020/0210758 A1* | 7/2020 | Upadhyay | G06F 18/22 |
| 2020/0242144 A1* | 7/2020 | Yoshida | G06F 16/3329 |
| 2020/0243075 A1* | 7/2020 | Cavallo | G10L 15/1815 |
| 2020/0279017 A1* | 9/2020 | Norton | G06N 3/045 |
| 2020/0301916 A1* | 9/2020 | Nguyen | G06F 16/3344 |
| 2021/0043200 A1* | 2/2021 | Goncalves Jordao | G10L 15/187 |
| 2021/0073199 A1* | 3/2021 | Bettaglio | G06N 7/00 |
| 2021/0074286 A1* | 3/2021 | Cotting | G10L 15/22 |
| 2021/0117458 A1* | 4/2021 | Higashinaka | G06F 16/3344 |
| 2021/0200795 A1* | 7/2021 | Upadhyay | G06F 40/295 |
| 2021/0256001 A1* | 8/2021 | Frantz | G06F 16/283 |
| 2021/0397866 A1* | 12/2021 | Ishikawa | G06F 3/167 |
| 2022/0108699 A1* | 4/2022 | Amakasu | G06F 16/61 |

OTHER PUBLICATIONS

"Bypassing Google TTS Engine initialization lag in Android", stack overflow, edited Mar 4 2017, 14 pps., <https://stackoverflow.com/questions/42417606/bypassing-google-tts-engine-initialization-lag-in-android>, 14 pages.

"How To Use IOS 10 Speech Recognition API to Convert Voice to Text", Enlume, By Knowledge Center, Nov. 11, 2016, <http://www.enlume.com/ios-10-speech-recognition-api-convert-voice-text/>, 4 pages.

Bornstein, Ari, "Building a Low Latency Smart Conversational Client", Jul. 11, 2016, Microsoft, Devel0per B10G, 10 pps., <https://www.microsoft.com/developerblog/2016/07/11/building-a-low-latency-smart-conversational-client/>, 10 pages.

Ramos, Igor S., "Improve Watson Text to Speech latency by 99% with Caching", Aug. 17, 2016, <https://www.igorsramos.com/watson-text-to-speech-caching/>, 5 pages.

* cited by examiner

PHONETIC COMPARISON FOR VIRTUAL ASSISTANTS

BACKGROUND

The present invention relates generally to the field of intelligent virtual assistants, and more particularly to optimizing an intelligent virtual assistant by using phonetic comparison to find a response stored in a local database.

Intelligent virtual assistants, herein referred to as virtual assistants (VAs), are software programs that can perform tasks or services for a user based on verbal commands and verbal queries. These services can include playing a song, a TV show, or a movie; providing information on the weather; setting an alarm; making a to-do list; and so on. Interaction between a VA and its user occurs through a voice-user interface (VUI) that can be implemented in personal computing devices, mobile devices, smart speakers, etc. VAs may also be referred to as intelligent personal assistants, smart assistants, intelligent virtual agents, smart virtual agents, and virtual agents. VAs utilize natural language processing engines and automatic speech recognition services to match inputs to executable tasks or services.

Generally, natural language processing engines and automatic speech recognition services do not take place within the local application of a VA. Instead, the local application of the VA routes the user input to a server or a cloud service that runs the voice command through a natural language processing engine and/or automatic speech recognition service to process the user input and generate an appropriate response. Once a response is received by the VA, the VA converts the response to audio and outputs it to the user.

Natural language processing (NLP) engines assist computers in understanding and interpreting human language as it is spoken. NLP engines use two main techniques: syntax and semantic analysis. Syntax is the way in which words are arranged to form a phrase, clause, sentence, or paragraph. Common syntax techniques include parsing, word segmentation, sentence breaking, morphological segmentation, and stemming. NLP engines use syntax to assess the meaning of a word, phrase, clause, sentence, or paragraph. Semantic analysis is used to relate words, phrases, clauses, sentences, or paragraphs to their language-independent meanings. Semantic analysis is performed first by analyzing the context of the word, phrase, clause, sentence, or paragraph in its surrounding text and then by analyzing the structure of the text to identify its proper meaning. Common semantic analysis techniques used by NLP engines include word sense disambiguation, named entity recognition, and natural language generation.

Speech recognition, also known as automatic speech recognition (ASR), refers to the analysis and translation of spoken language into text (e.g., speech-to-text conversion (STT)) by a computer system. An analog-to-digital converter (ADC) is used to translate analog waves of a user's voice into data that a computer can understand. To translate the waves into data, the ADC takes precise measurements of the waves at frequent intervals. The signal produced by the ADC is then divided into short segments that are matched to known phonemes. A phoneme is a perceptually distinct unit of sound that distinguishes one word from another. Once matched, the known phonemes are examined in the context of the surrounding phonemes and compared to a library of known words, phrases, and sentences. Based on the findings of the examination and comparison, the user's spoken words are translated, and a response is produced in the form of text or a computer command.

SUMMARY

Aspects of an embodiment of the present invention disclose a method, computer program product, and computer system for optimizing an intelligent virtual assistant by using phonetic comparison to find a response stored in a local database. A processor receives an audio input on a computing device. A processor transcribes the audio input to text. A processor compares the text to a set of user queries and commands in a local database of the computing device using a phonetic algorithm. A processor determines whether a user query or command of the set of user queries and commands meets a pre-defined threshold of similarity to the text. Responsive to determining that the user query or command meets the pre-defined threshold of similarity, a processor identifies an intention of a set of intentions stored in the local database corresponding to the user query or command. A processor identifies a response of a set of responses in the local database corresponding to the intention. A processor outputs the response audibly.

DETAILED DESCRIPTION

Figure 1:
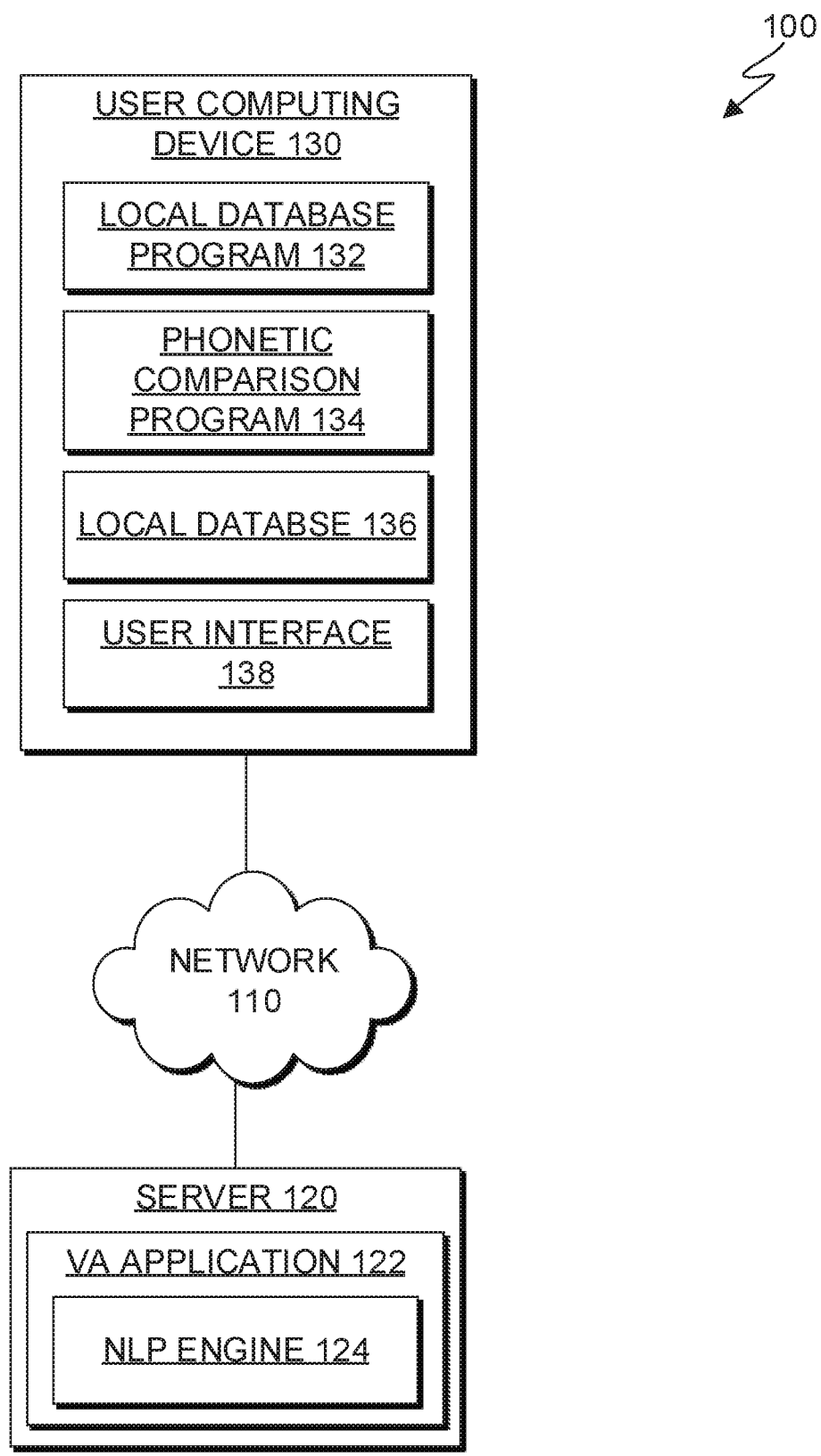
FIG. 1 is a functional block diagram illustrating a virtual assistant environment, in accordance with an embodiment of the present invention.

Embodiments of the present invention recognize that current VA applications can be optimized by reducing latency between receiving an audio input and outputting a response. Generally, NLP engines and/or ASR services used by a VA application are not hosted on the local device running the VA application through a user interface (i.e., a VUI of a smart speaker). Thus, when an audio input is received, the audio input must be sent to where the VA application is being hosted (i.e., a private cloud, server, etc.) to determine a response, and then, the response is sent back to the local device to output the response.

Embodiments of the present invention further recognize that ASR services can produce errors in the text transcribed (e.g., transcribing an incorrect word or misspelling a word) that can lead to incorrect or irrelevant responses being output to the user. ASR services have been trained on the English language more extensively than other languages (i.e., Portuguese), and therefore, ASR services are more likely to output transcription and spelling errors from non-English audio inputs.

Embodiments of the present invention provide a program for setting up a local database on a local device running a VA application with a file of previous user queries and commands and possible user queries and commands to compare audio inputs to, a file of intentions or key words that correspond to the queries and commands, and a file of responses that correspond to the intentions. Embodiments of the present invention also provide a program for updating the local database with new possible user queries and commands, intentions, and/or responses on a periodic basis. Embodiments of the present invention further provide a program that phonetically compares an audio input, which has been converted to text using ASR services, to queries and commands stored in the local database, identifies a query or command that meets a threshold of similarity, identifies an intention corresponding to the query or command, identifies a response corresponding to the intention, and outputs the response. Therefore, embodiments of the present invention reduce latency of VA applications by storing responses locally and improving accuracy of responses through phonetic comparison.

Embodiments of the present invention provide programs that interrupt or interject into the traditional process flow of an audio input into a VA application to allow for generation of an appropriate response locally, so that the local VA application runs more independently from a remote cloud or server system.

Embodiments of the present invention phonetically compare the transcribed text from the audio input to the file of previous and possible user queries and commands by calculating a Jaro-Winkler distance to identify the most similar previous or possible user query or command. Embodiments of the present invention use the calculated Jaro-Winkler distance for the most similar query or command to determine whether the threshold of similarity is met. The Jaro-Winkler distance is a distance metric used to calculate the distance between two string variables. The metric is scaled between 0 (not similar at all) and 1 (exact match). The Jaro-Winkler distance $d_w$ of two given strings, $s_1$ and $s_2$, is defined as:

$$d_w = d_j + (l\rho(1-d_j));$$

where $d_j$ is the Jaro distance for strings $s_1$ and $s_2$; l is the length of common prefix at the start of the string up to a maximum of four characters; and $\rho$ is a constant scaling factor for how much the score is adjusted upwards for having common prefixes. The standard value for $\rho$ is 0.1, and should not exceed 0.25, otherwise, the similarity could become larger than 1. The Jaro distance $d_j$ of two given strings, $s_1$ and $s_2$, is defined as:

$$d_j = \begin{cases} 0 & \text{if } m = 0 \\ \frac{1}{3}\left(\frac{m}{|s_1|} + \frac{m}{|s_2|} + \frac{m-t}{m}\right) & \text{otherwise} \end{cases};$$

where $|s_i|$ is the length of the string $s_i$; m is the number of matching characters; and t is half the number of transpositions. Two characters from $s_1$ and $s_2$ are considered matching only if they are the same and not farther than:

$$\left\lfloor \frac{\max(|s_1|, |s_2|)}{2} \right\rfloor - 1.$$

Each character of $s_1$ is compared with all its matching characters in $s_2$. The number of matching (but different sequence order) characters divided by 2 defines the number of transpositions.

The present invention will now be described in detail with reference to the Figures.

FIG. 1 depicts a functional block diagram illustrating virtual assistant environment 100, in accordance with an embodiment of the present invention. FIG. 1 provides only an illustration of one embodiment of the present invention and does not imply any limitations with regard to the environments in which different embodiments may be implemented. In the depicted embodiment, virtual assistant environment 100 includes server 120 and user computing device 130 interconnected over network 110. Virtual assistant environment 100 may include additional computing devices, servers, computers, or other devices not shown.

Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between server 120 and user computing device 130.

Server 120 operates to run VA application 122 and NLP engine 124. In some embodiments, server 120 may be a management server, a web server, or any other electronic device or computing system capable of receiving and sending data. In some embodiments, server 120 may be a laptop computer, tablet computer, netbook computer, personal computer (PC), a desktop computer, a smart phone, or any programmable electronic device capable of running VA application 122 and communicating with user computing device 130 via network 110. In other embodiments, server 120 represents a server computing system utilizing multiple computers as a server system, such as a cloud computing environment. Server 120 may include additional components (i.e., a STT converter), databases, or other programs not shown. Server 120 may include components as described in further detail in FIG. 4.

VA application 122 operates as a VA application that uses NLP and/or STT to understand natural-language inputs and to generate an appropriate response to the input. In the depicted embodiment, VA application 122 resides on server 120 and comprises NLP engine 124 for processing natural language inputs. In other embodiments, VA application 122 may reside on user computing device 130 or another computing device (not shown) provided that VA application 122 has access to network 110. In an embodiment, NLP engine 124 of VA application 122 receives an audio input, uses NLP techniques to transcribe the audio input to text, and produces a response. For example, NLP engine 124 may receive an audio input from phonetic comparison program 134 of user computing device 130, use NLP techniques to transcribe the audio input to text, and send the text back to phonetic comparison program 134.

User computing device 130 operates to run local database program 132, phonetic comparison program 134, user interface 138, and to store and/or send data using local database 136. In an embodiment, user computing device 130 sends to and/or receives data from VA application 122 via network 110. In some embodiments, user computing device 130 may be a management server and/or any other electronic device or computing system capable of receiving and sending data. In some embodiments, user computing device 130 may be, but is not limited to, an electronic device, such as a smart speaker, a laptop computer, a tablet computer, a netbook computer, a personal computer (PC), a desktop computer, a smart phone, a portable media player, a personal digital assistant (PDA), a television, a wearable electronic device, or any programmable electronic device capable of running local database program 132, phonetic comparison program 134, user interface 138, storing and/or sending data using database 136, and communicating with server 120 via network 110. User computing device 130 may include components as described in further detail in FIG. 4.

Local database program 132 operates to set up and to periodically update a local database. In an embodiment, local database program 132 sets up a local database, such as local database 136, with a file of previous user queries and commands and possible user queries and commands, a file of intentions or keywords used to match a query or command with an appropriate response, and a file of responses in which each response corresponds to an intention. In an embodiment, local database program 132 updates the local database, i.e., local database 136, with new possible user queries and commands, new intentions, and/or new responses every pre-configured time interval configured by a user through user interface 138. In the depicted embodiment, local database program 132 resides on user computing device 130. In other embodiments, local database program 132 may reside on server 120 or another computing device (not shown) provided that local database program 132 has access to network 110.

Phonetic comparison program 134 operates as a program for comparing the transcribed text of an audio input to previous/possible user queries and commands stored in local database 136 to identify an appropriate response to output back to the user. In an embodiment, phonetic comparison program 134 receives an audio input. In an embodiment, phonetic comparison program 134 transcribes the audio input to text. In an embodiment, phonetic comparison program 134 compares the transcribed text to previous/possible user queries and commands stored in local database 136 to identify a most similar previous/possible user query or command. In an embodiment, phonetic comparison program 134 determines whether a threshold of similarity is met between the transcribed text and the identified most similar previous/possible user query and command stored in local database 136. In an embodiment in which the threshold of similarity is met, phonetic comparison program 134 identifies an intention and a corresponding response. In an embodiment, phonetic comparison program 134 outputs the response. In the depicted embodiment, phonetic comparison program 134 resides on user computing device 130. In other embodiments, phonetic comparison program 134 may reside on server 120 or another computing device (not shown) provided that phonetic comparison program 134 has access to network 110.

Local database 136 operates as a repository for a set of files used to determine an appropriate response to audio inputs received by a local device for a VA application. An audio input includes, but is not limited to, a command, a request, a statement, a narrative, and a query in natural language form from which the user seeks either an informational answer, the performance of a requested task, or a combination of the two by the VA. The set of files include a file of previous/possible user queries and commands, a file of intentions, and a file of responses.

The file of previous/possible user queries and commands includes possible user queries and commands used to train the VA application with real life examples. In an embodiment, the possible user queries and commands include examples of multiple utterances or ways that a user may state a query or command. For example, if the user wants to know more about the weather, possible queries stored in the file include: "What is the weather like?", "How is the weather in my town?", "What is the weather like in Brazil?" The possible user queries and commands can out of an initial training and/or set up of VA application 122. These examples are used by VA application 122 to build a machine learning model that can recognize the same or similar types of utterances and map them to an appropriate intention. This file also includes previous user queries and commands received on the local device, i.e., user computing device 130, from a user through a user interface, i.e., a VUI, e.g., user interface 138. In an embodiment, the file contains audio files and/or text files for each previous/possible user query and command. In an embodiment, the file of previous user queries and commands is updated by phonetic comparison program 134 with the audio input received through user interface 138 and/or the text file by NLP engine 124 when NLP engine 124 can process the audio input and identify an intention from VA application 122. The audio input and text file become an additional previous user query or command that is an additional example to compare future audio inputs to locally on user computing device 130. Each previous/possible user query or command has at least one corresponding intention.

The file of intentions or keywords is a JavaScript Object Notation (JSON) file. A JSON file is a lightweight, text-based, and human-readable file primarily used to store data (i.e., intentions) in JSON format and to transmit that data between an application and a server, such as user interface 138 and server 120. JSON files are built on two structures, a collection of key/value pairs and an ordered list of values. An example of a key/value pair is "name": "John" in which the key is "name" and the value is "John". An intention represents a goal or purpose of a user's audio input. An intention or keyword is identified for each goal of a user's audio input. For example, for each user query or command that includes the word "weather", phonetic comparison program 134 searches the file of intentions for a "weather" intention. Each intention has a corresponding response or set of responses that can be connected via the key/value pair structure.

The file of responses includes text and/or audio files of corresponding responses for each intention of the file of intentions. A response includes, but is not limited to, an audio file that is an answer to a question or the completion of a command output through user interface 138 to a user.

Local database 136 can be implemented with any type of device capable of storing data and configuration files that can be accessed and utilized by user computing device 130. In an embodiment, local database 136 is accessed by user computing device 130, local database program 132, phonetic comparison program 134, and/or server 120 to store text and/or audio inputs. In an embodiment, local database 136 is accessed by user computing device 130, local database program 132, phonetic comparison program 134, and/or server 120 to access the text and audio inputs stored in the file of previous/possible user queries and commands, the file of intentions, and/or the file of responses. In the depicted embodiment, local database 136 resides on user computing device 130. In another embodiment, local database 136 may reside elsewhere within virtual assistant environment 100 provided local database 136 has access to network 110.

User interface 138 operates as a local user interface on user computing device 130 of VA application 122. In an embodiment, user interface 138 is a VUI of VA application 122. In an embodiment, user interface 138 enables a user of user computing device 130 to interact with a VA, i.e., VA application 122, by making a command, request, statement, narrative, and/or inquiry in natural language form, by receiving an informational answer, or by having a requested task performed. In an embodiment, user interface 138 enables a user to configure a time interval (i.e., hourly, daily, weekly, etc.) for which local database 136 is updated by local database program 132.

Figure 2:
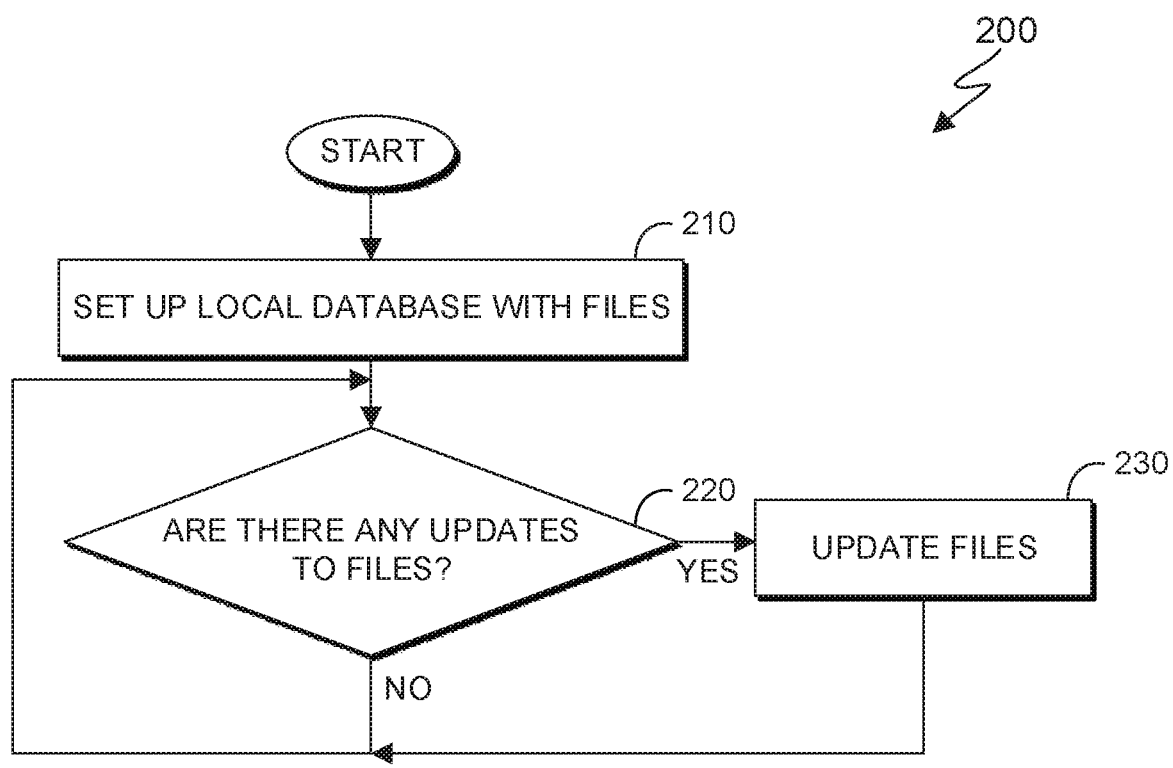
FIG. 2 is a flowchart depicting the steps for a local database program, in a virtual assistant environment such as the one depicted in FIG. 1, in accordance with an embodiment of the present invention.

FIG. 2 depicts flowchart 200 of the steps for local database program 132, in virtual assistant environment 100 as depicted in FIG. 1, in accordance with an embodiment of the present invention. In an embodiment, local database program 132 sets up a local database, i.e., local database 136, with a file of previous/possible user queries and commands, a file of intentions, and a file of responses. In an embodiment, local database program 132 checks for new previous/possible user queries and commands, intentions, and/or responses to update local database 136 with every pre-configured time interval. It should be appreciated that the process depicted in FIG. 2 illustrates one possible iteration of the process flow.

In step 210, local database program 132 sets up a local database. In an embodiment, local database program 132 sets up a local database with a file of previous/possible user queries and commands, a file of intentions, and a file of responses. In an embodiment, local database program 132 sets up local database 136 to store new previous/possible user queries and commands, new intentions, and new responses.

In decision 220, after a pre-configured time interval, local database program 132 determines whether there are new previous/possible user queries and commands, new intentions, and/or new responses. In an embodiment, local database program 132 checks for new previous/possible user queries and commands, new intentions, and/or new responses every pre-configured time interval, which is configured by a user through user interface 138. In an embodiment, local database program 132 checks for new previous/possible user queries and commands, new intentions, and/or new responses in VA application 122 on server 120 and in user interface 138 since the last update.

If local database program 132 determines there are new previous/possible user queries and commands, new intentions, and/or new responses (decision 220, YES branch), then local database program 132 updates the files on the local database, i.e., local database 136, accordingly (step 230). If local database program 132 finds a new previous/possible user query or command for an existing intention stored in local database 136, then local database program 132 updates the file of previous/possible user queries and commands. If local database program 132 finds a new previous/possible user query or command and there is neither an intention nor an appropriate response that corresponds to the new previous/possible user query or command, then local database program 132 updates the file of previous/possible user queries and commands with the new previous/possible user query or command, the file of intentions with a new intention, and the file of responses with at least one response for the corresponding new intention.

If local database program 132 determines there are no new previous/possible user queries and commands, new intentions, and/or new responses (decision 220, NO branch), then local database program 132 waits the pre-configured time interval before completing another update.

Figure 3:
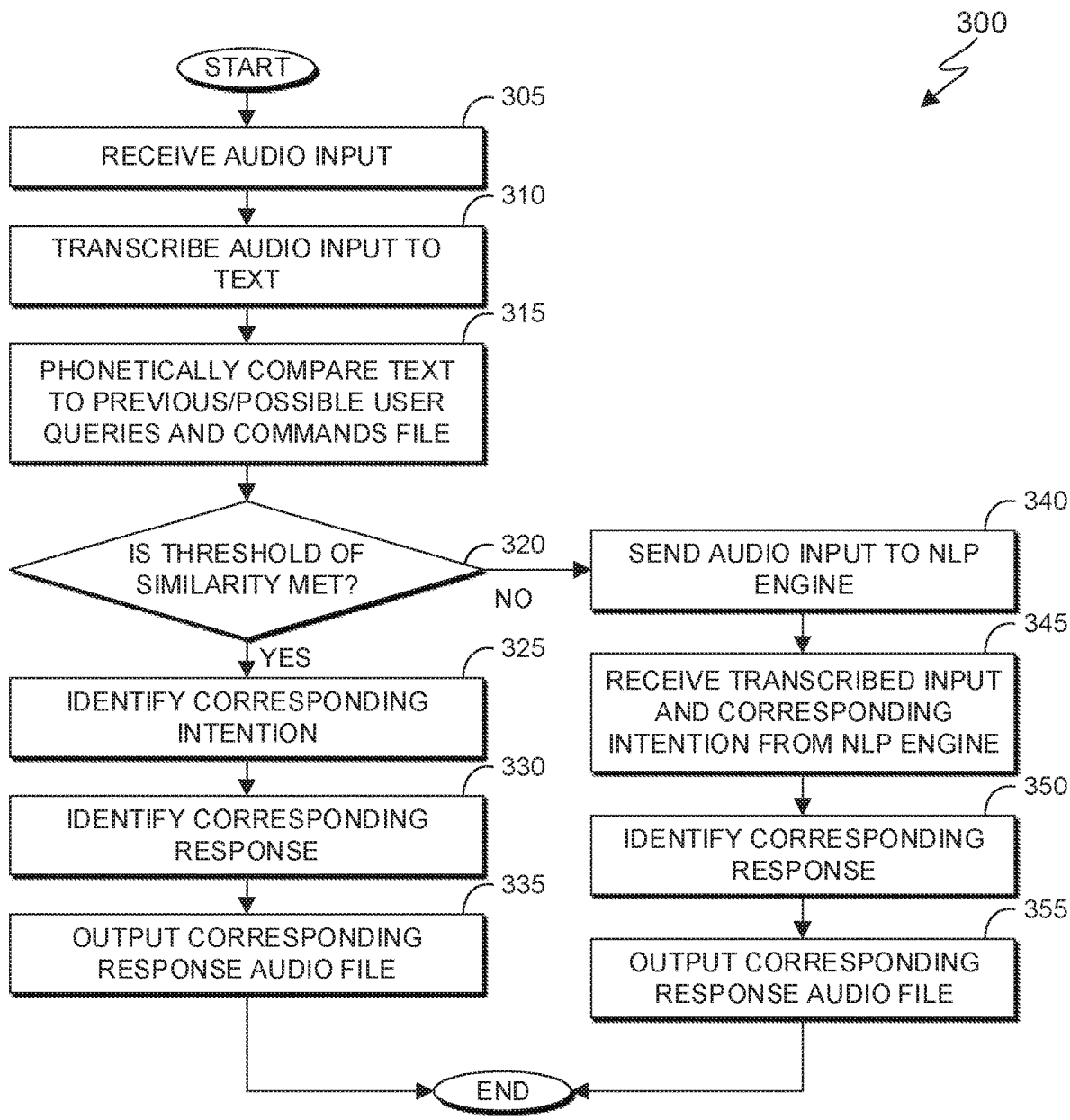
FIG. 3 is a flowchart depicting the steps for a phonetic comparison program, in a virtual assistant environment such as the one depicted in FIG. 1, in accordance with an embodiment of the present invention.

FIG. 3 depicts flowchart 300 of the steps for phonetic comparison program 134, in virtual assistant environment 100 as depicted in FIG. 1, in accordance with an embodiment of the present invention. In an embodiment, phonetic comparison program 134 receives an audio input, transcribes the audio input to text, phonetically compares the transcribed text to previous/possible user queries and commands stored in local database 136, determines whether the comparison meets a threshold of similarity, and, if the comparison meets the threshold of similarity, identifies a corresponding intention and response from local database 136, and outputs the response. It should be appreciated that the process depicted in FIG. 3 illustrates one possible iteration of the process flow, which repeats for each audio input received through user interface 138.

In step 305, phonetic comparison program 134 receives an audio input. In an embodiment, phonetic comparison program 143 receives an audio input from a user through user interface 138 of user computing device 130. For example, phonetic comparison program 143 receives an audio input audibly from a user through a VUI. In an embodiment, phonetic comparison program 134 receives an audio input in the form of a user query. In an embodiment, phonetic comparison program 134 receives an audio input in the form of a user command.

In step 310, phonetic comparison program 134 transcribes the audio input to text. In an embodiment, phonetic comparison program 134 transcribes the audio input to text using a STT converter or an ASR service. In an embodiment, phonetic comparison program 134 uses an STT converter or ASR service found on user computing device 130. In another embodiment, phonetic comparison program 134 sends the audio input to VA application 122 to transcribe the audio input to text using an STT converter or ASR service used by VA application 122, and then phonetic comparison program 134 receives the transcribed text from VA application 122.

In step 315, phonetic comparison program 134 compares the transcribed text to previous/possible user queries and commands stored in local database 136. In an embodiment, phonetic comparison program 134 compares the phonetic pronunciation of the transcribed text to the phonetic pronunciation of previous/possible user queries and commands stored in local database 136. In an embodiment, phonetic comparison program 134 compares the transcribed text to the previous/possible user queries and commands using a phonetic algorithm. In an embodiment, phonetic comparison program 134 compares the transcribed text to the previous/possible user queries and commands by calculating a Jaro-Winkler distance between the transcribed text and each previous/possible user query and command.

In decision 320, phonetic comparison program 134 determines whether a threshold of similarity is met. In an embodiment, phonetic comparison program 134 determines whether the threshold of similarity is met between the transcribed text and at least one of the previous/possible user queries and commands stored in local database 136. In an embodiment, phonetic comparison program 134 determines whether the threshold of similarity is met based on the calculated Jaro-Winkler distance, which is a value between zero and one. In an embodiment, the threshold of similarity is pre-configured by a user through user interface 138. In another embodiment, the threshold of similarity is pre-configured by VA application 122 based on the threshold that yields the most appropriate responses. For example, the threshold of similarity may be configured to be greater than or equal to 0.8.

If phonetic comparison program 134 determines that the Jaro-Winkler distance between the transcribed text and at least one of the previous/possible user queries and commands meets the threshold of similarity (decision 320, YES branch), then phonetic comparison program 134 identifies an intention corresponding to the previous/possible user query or command from local database 136 (step 325). If phonetic comparison program 134 determines that the Jaro- Winkler distance does not meet the threshold of similarity (decision 320, NO branch), then phonetic comparison program 134 sends the audio input to NLP engine 124 (step 340).

In step 325, phonetic comparison program 134 identifies a corresponding intention in local database 136. In an embodiment, responsive to determining the threshold of similarity is met, phonetic comparison program 134 identifies an intention that corresponds to the previous/possible user query or command that met the threshold of similarity. In an embodiment, phonetic comparison program 134 identifies the corresponding intention in the file of intentions in local database 136.

In step 330, phonetic comparison program 134 identifies a corresponding response in local database 136. In an embodiment, phonetic comparison program 134 identifies the response that corresponds to the intention identified in step 325. In an embodiment, phonetic comparison program 134 identifies the corresponding response in the file of responses in local database 136.

In step 335, phonetic comparison program 134 outputs the audio file of the corresponding response from local database 136. In an embodiment, phonetic comparison program 134 reproduces the audio file of the corresponding response. In an embodiment, phonetic comparison program 134 outputs the audio file of the corresponding response stored in the file of responses. In an embodiment, phonetic comparison program 134 outputs the audio file audibly on user computing device 130 for a user to hear, e.g., through user interface 138.

In step 340, phonetic comparison program 134 sends the audio input to NLP engine 124. In an embodiment, responsive to determining the threshold of similarity is not met, phonetic comparison program 134 sends the audio input to an NLP engine, such as NLP engine 124 of VA application 122. In an embodiment, phonetic comparison program 134 sends the audio input to NLP engine 124 to process the audio input using NLP techniques into text and to identify an intention of the VA application system that corresponds to the transcribed text.

In step 345, phonetic comparison program 134 receives a text file of the transcribed audio input and a corresponding intention from NLP engine 124. In an embodiment, phonetic comparison program 134 receives a text file from NLP engine 124 that contains the result of processing the audio input through NLP engine 124. In an embodiment, phonetic comparison program 134 updates the previous user queries and commands file in local database 136 with the initial audio input received in step 305, the text file from NLP engine 124, and correlates the intention identified by NLP engine 124 to the text file. The initial audio input and text file become an additional example to compare future audio inputs with to identify an intention and then finally an appropriate response.

In another embodiment, phonetic comparison program 134 receives a message from NLP engine 124 that the audio input could not be processed and no corresponding intention was identified. In this embodiment, phonetic comparison program 134 audibly outputs a standard response conveying that an appropriate response could not be found, e.g., "I do not understand your question.", on user computing device 130 for a user to hear, e.g., through user interface 138.

In step 350, phonetic comparison program 134 identifies a corresponding response in local database 136. In an embodiment, phonetic comparison program 134 identifies the response that corresponds to the intention received in step 345. In an embodiment, phonetic comparison program 134 identifies the corresponding response in the file of responses in local database 136.

In step 355, phonetic comparison program 134 outputs the audio file of the corresponding response from local database 136. In an embodiment, phonetic comparison program 134 reproduces the audio file of the corresponding response. In an embodiment, phonetic comparison program 134 outputs the audio file of the corresponding response stored in the file of responses. In an embodiment, phonetic comparison program 134 outputs the audio file audibly on user computing device 130 for a user to hear.

Figure 4:
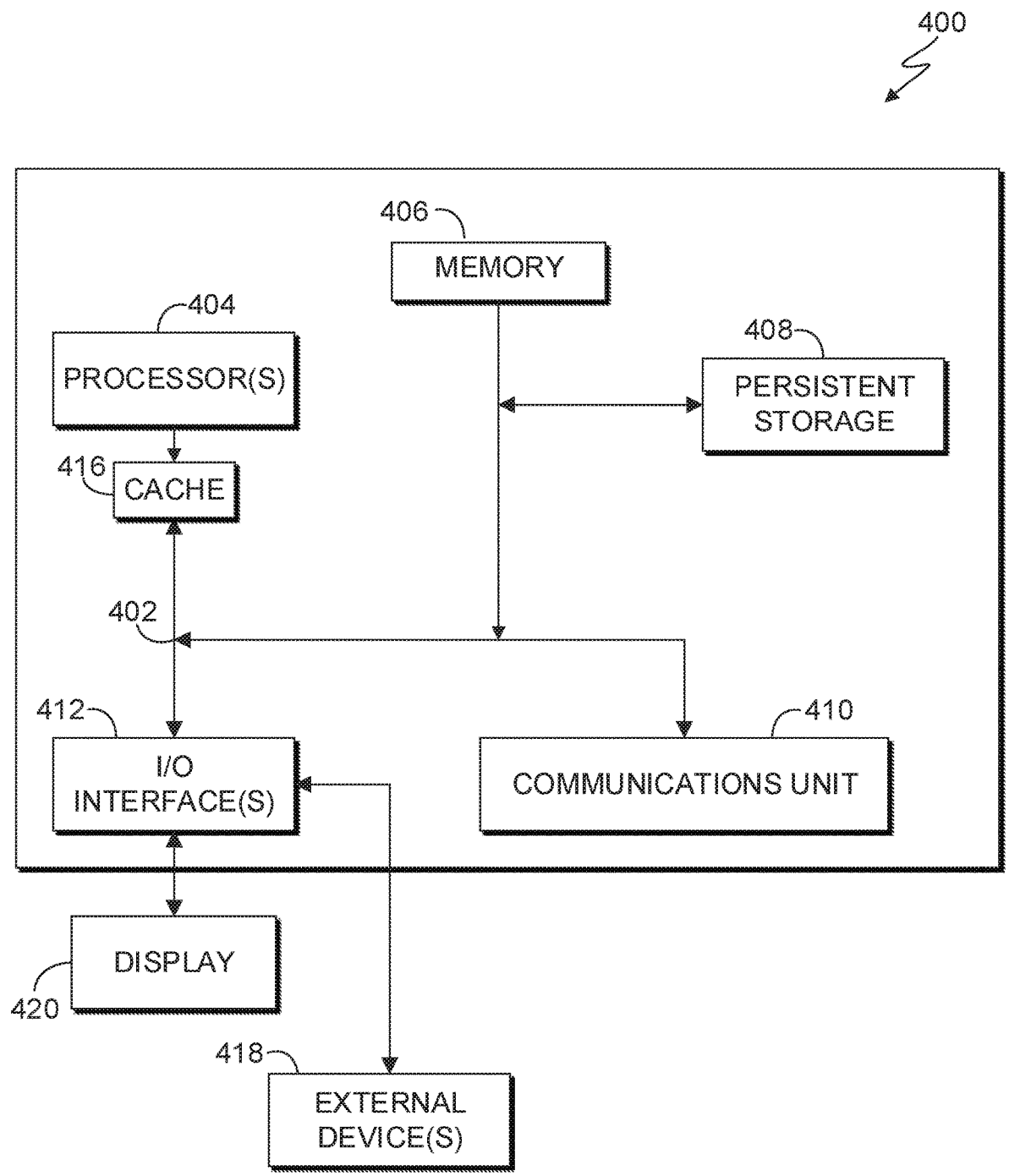
FIG. 4 depicts a block diagram of components of a computing device in a virtual assistant environment such as the one depicted in FIG. 1, in accordance with an embodiment of the present invention.

FIG. 4 depicts a block diagram of components of computer 400 in virtual assistant environment 100 as depicted in FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

As depicted, computer 400 includes a communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM). In general, memory 406 can include any suitable volatile or non-volatile computer-readable storage media. Cache is a fast memory that enhances the performance of computer processor(s) 404 by holding recently accessed data, and data near accessed data, from memory 406.

Local database program 132 and phonetic comparison program 134 may be stored in memory 406 and in persistent storage 408 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Programs, such as local database program 132 and phonetic comparison program 134 may be downloaded to persistent storage 408 through communications unit 410.

I/O interface(s) 412 allows for input and output of data with other devices that may be connected to server 120 and user computing device 130. For example, I/O interface 412 may provide a connection to external devices 418 such as a keyboard, keypad, a touch screen, and/or some other suitable input device. External devices 418 may also include portable computer-readable storage media such as, for example, thumb drives, portable optical or magnetic disks, and memory cards. Software and data used to practice embodiments of the present invention may be stored on such portable computer-readable storage media and may be loaded onto the persistent storage 408 via I/O interface(s) 412. The I/O interface(s) 412 may similarly connect to a display 420.

Display 420 provides a mechanism to display data to a user and may be, for example, a computer monitor.

Local database program 132 and phonetic comparison program 134 described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    enabling, by one or more processors of a computing device, a local database on the computing device to store three types of files, wherein the three types of files are a file of user queries and commands, a file of intentions, and a file of responses, wherein each user query and command in the file of user queries and commands has at least one corresponding intention in the file of intentions, and wherein each intention in the file of intentions has at least one corresponding response in the file of responses;
    receiving, by the one or more processors audio input;
    transcribing, by the one or more processors, the audio input to text;
    comparing, by the one or more processors, the text to the file of user queries and commands using a phonetic algorithm;
    determining, by the one or more processors, whether a user query or command in the file of user queries and commands meets a pre-defined threshold of similarity to the text;
    responsive to determining that the user query or command meets the pre-defined threshold of similarity, identifying, by the one or more processors, an intention in the file of intentions that corresponds to the user query or command;
    identifying, by the one or more processors, a response in the file of responses that corresponds to the identified intention; and
    outputting, by the one or more processors, the response audibly.

2. The computer-implemented method of claim 1, wherein the phonetic algorithm is Jaro-Winkler distance algorithm.

3. The computer-implemented method of claim 2, wherein comparing the text to the file of user queries and commands using the phonetic algorithm comprises:
    calculating, by the one or more processors, a set of Jaro-Winkler distances, wherein the set of Jaro-Winkler distances comprises a Jaro-Winkler distance between the text and each user query or command in the file of user queries and commands.

4. The computer-implemented method of claim 3, wherein determining whether the user query or command meets the pre-defined threshold of similarity to the text comprises:
    determining, by the one or more processors, whether at least one of the set of Jaro-Winkler distances meets the pre-defined threshold of similarity.

5. The computer-implemented method of claim 1, further comprising:
    responsive to determining that the user query or response does not meet the pre-defined threshold of similarity, sending, by the one or more processors, the audio input to a natural language processing engine;
    receiving, by the one or more processors, a transcription of the audio input from the natural language processing engine in text form; and
    determining, by the one or more processors, whether there is a corresponding intention and a corresponding response in the local database to the transcription.

6. The computer-implemented method of claim 5, further comprising:
    responsive to determining that the transcription has a corresponding response in the file of responses in the local database, outputting, by the one or more processors, the corresponding response audibly.

7. The computer-implemented method of claim 1, further comprising:
    updating, by the one or more processors, one or more files of the three types of files in the local database of the computing device with at least one of new text and audio inputs on a pre-configured time interval defined by the user.

8. A computer program product comprising:
    one or more computer-readable storage media and program instructions stored on the one or more computer-readable storage media, the program instructions comprising:
    program instructions to enable a local database on a computing device to store three types of files, wherein the three types of files are a file of user queries and commands, a file of intentions, and a file of responses, wherein each user query and command in the file of user queries and commands has at least one corresponding intention in the file of intentions, and wherein each intention in the file of intentions has at least one corresponding response in the file of responses;
    program instructions to receive an audio input on the computing device;
    program instructions to transcribe the audio input to text;
    program instructions to compare the text to the file of user queries and commands using a phonetic algorithm;
    program instructions to determine whether a user query or command in the file of user queries and commands meets a pre-defined threshold of similarity to the text;
    responsive to determining that the user query or command meets the pre-defined threshold of similarity, program instructions to identify an intention in the file of intentions that corresponds to the user query or command;

program instructions to identify a response in the file of responses that corresponds to the identified intention; and program instructions to output the response audibly.

9. The computer program product of claim 8, wherein the phonetic algorithm is Jaro-Winkler distance algorithm.

10. The computer program product of claim 9, wherein comparing the text to the file of user queries and commands using the phonetic algorithm comprises:

program instructions to calculate a set of Jaro-Winkler distances, wherein the set of Jaro-Winkler distances comprises a Jaro-Winkler distance between the text and each user query or command in the file of user queries and commands.

11. The computer program product of claim 10, wherein determining whether the user query or command meets the pre-defined threshold of similarity to the text comprises:

program instructions to determine whether at least one of the set of Jaro-Winkler distances meets the pre-defined threshold of similarity.

12. The computer program product of claim 8, further comprising:

responsive to determining that the user query or response does not meet the pre-defined threshold of similarity, program instructions to send the audio input to a natural language processing engine;

program instructions to receive a transcription of the audio input from the natural language processing engine in text form; and program instructions to determine whether there is a corresponding intention and response in the local database to the transcription.

13. The computer program product of claim 12, further comprising:

responsive to determining that the transcription has a corresponding response in the file of responses in the local database, program instructions to output the corresponding response audibly.

14. The computer program product of claim 8, further comprising:

program instructions to update one or more files of the three types of files in the local database of the computing device with at least one of new text and audio inputs on a pre-configured time interval defined by the user.

15. A computer system comprising:

one or more computer processors;

one or more computer-readable storage media;

program instructions stored on the computer-readable storage media for execution by at least one of the one or more processors, the program instructions comprising:

program instructions to enable a local database on a computing device to store three types of files, wherein the three types of files are a file of user queries and commands, a file of intentions, and a file of responses, wherein each user query and command in the file of user queries and commands has at least one corresponding intention in the file of intentions, and wherein each intention in the file of intentions has at least one corresponding response in the file of responses;

program instructions to receive an audio input on the computing device;

program instructions to transcribe the audio input to text;

program instructions to compare the text to the file of user queries and commands using a phonetic algorithm;

program instructions to determine whether a user query or command in the file of user queries and commands meets a pre-defined threshold of similarity to the text;

responsive to determining that the user query or command meets the pre-defined threshold of similarity, program instructions to identify an intention in the file of intentions that corresponds to the user query or command;

program instructions to identify a response in the file of responses that corresponds to the identified intention; and program instructions to output the response audibly.

16. The computer system of claim 15, wherein comparing the text to the file of user queries and commands using the phonetic algorithm comprises:

program instructions to calculate a set of Jaro-Winkler distances, wherein the set of Jaro-Winkler distances comprises a Jaro-Winkler distance between the text and each user query or command in the file of user queries and commands.

17. The computer system of claim 16, wherein determining whether the user query or command meets the pre-defined threshold of similarity to the text comprises:

program instructions to determine whether at least one of the set of Jaro-Winkler distances meets the pre-defined threshold of similarity.

18. The computer system of claim 15, further comprising:

responsive to determining that the user query or response does not meet the pre-defined threshold of similarity, program instructions to send the audio input to a natural language processing engine;

program instructions to receive a transcription of the audio input from the natural language processing engine in text form; and program instructions to determine whether there is a corresponding intention and response in the local database to the transcription.

19. The computer system of claim 18, further comprising:

responsive to determining that the transcription has a corresponding response in the file of responses in the local database, program instructions to output the corresponding response audibly.

20. The computer system of claim 15, further comprising:

program instructions to update one or more files of the three types of files in the local database of the computing device with at least one of new text and audio inputs on a pre-configured time interval defined by the user.

* * * * *